No. 797,694. PATENTED AUG. 22, 1905.
H. A. KNOX.
MOTOR VEHICLE.
APPLICATION FILED MAY 24, 1905.
5 SHEETS—SHEET 2.
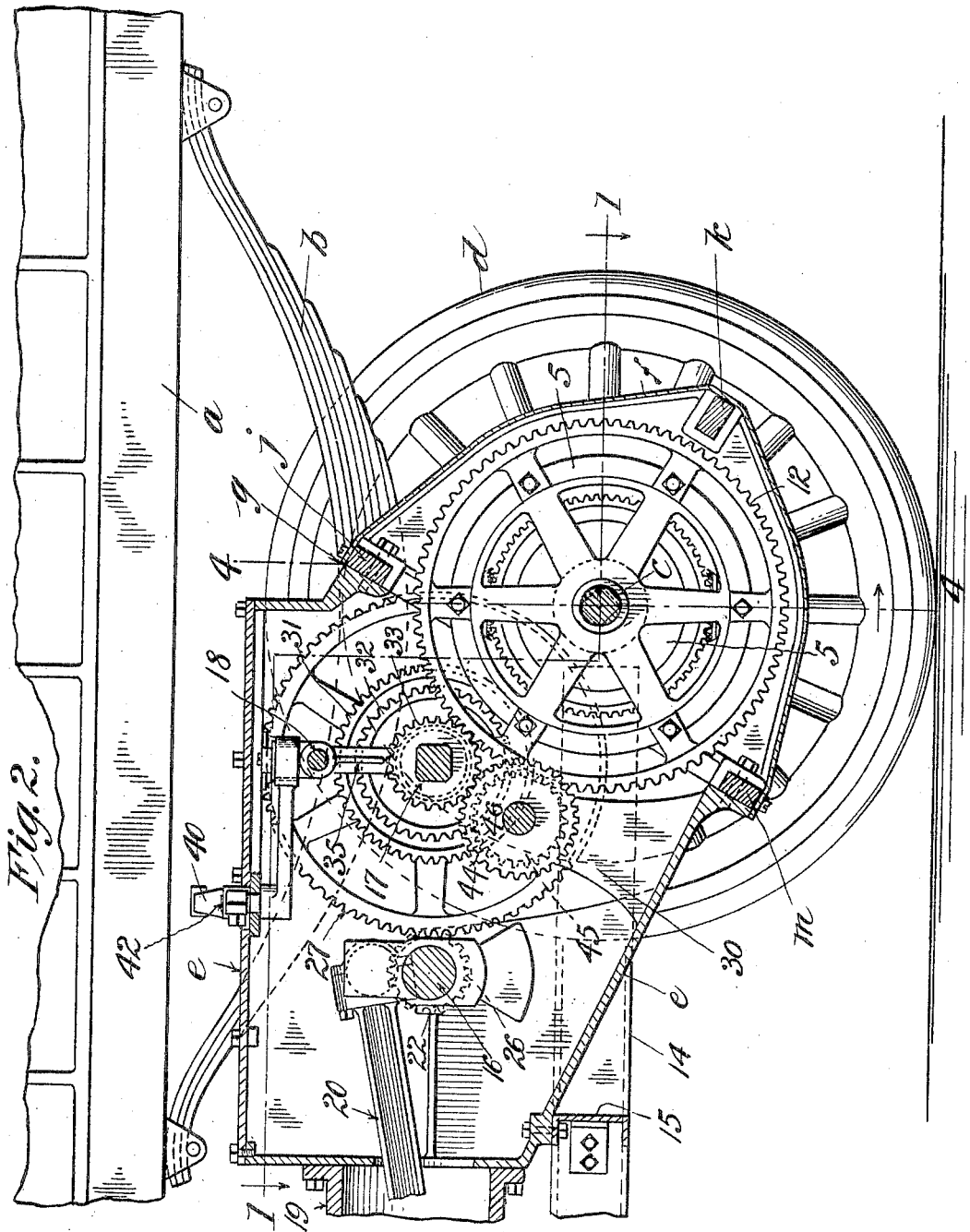
Witnesses:
H. L. Sprague
E. L. Smith.
Inventor:
Harry A Knox.
by Chapin & Co
Attorneys.

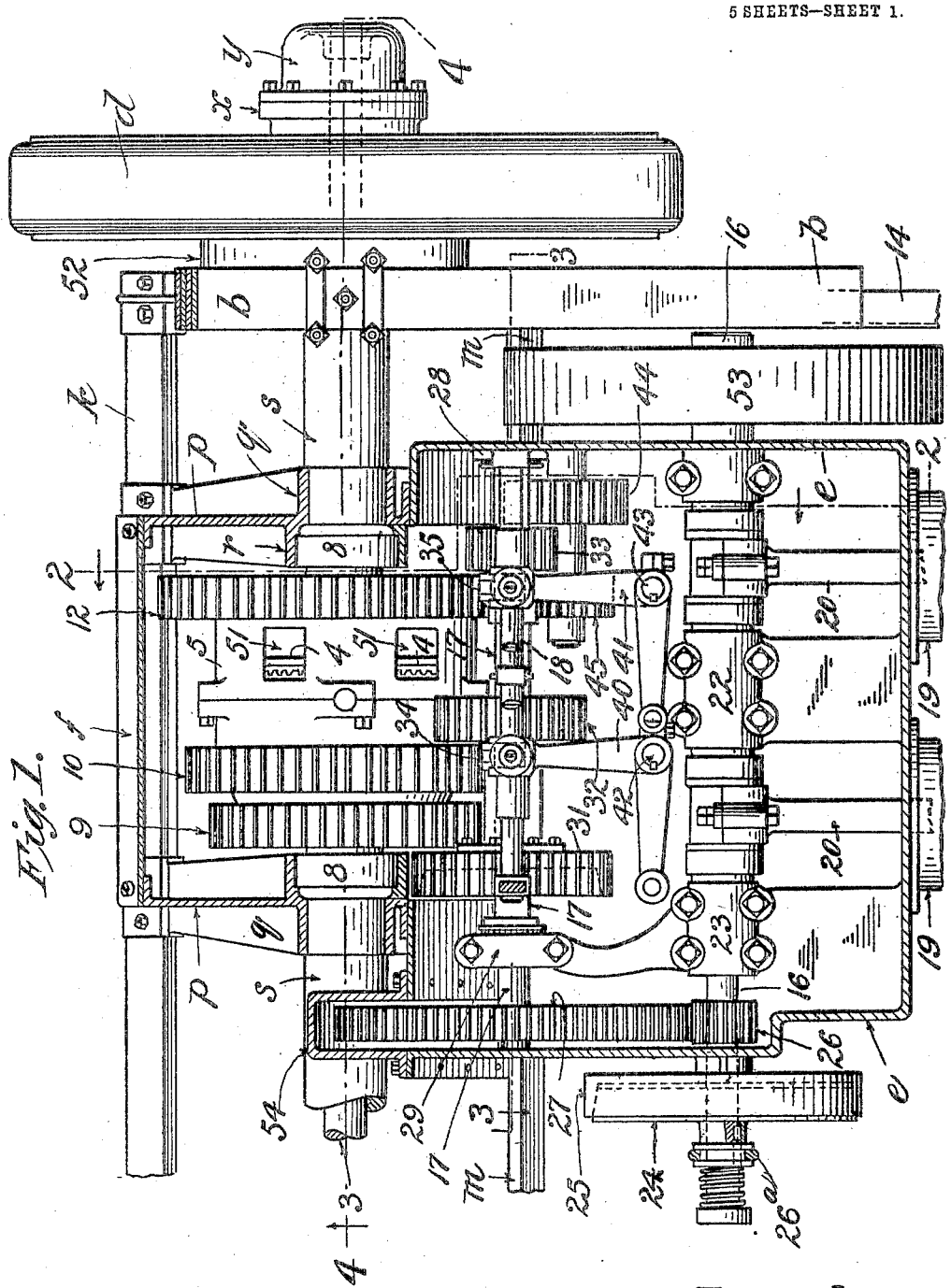

No. 797,694. PATENTED AUG. 22, 1905.
H. A. KNOX.
MOTOR VEHICLE.
APPLICATION FILED MAY 24, 1905.
5 SHEETS—SHEET 3.
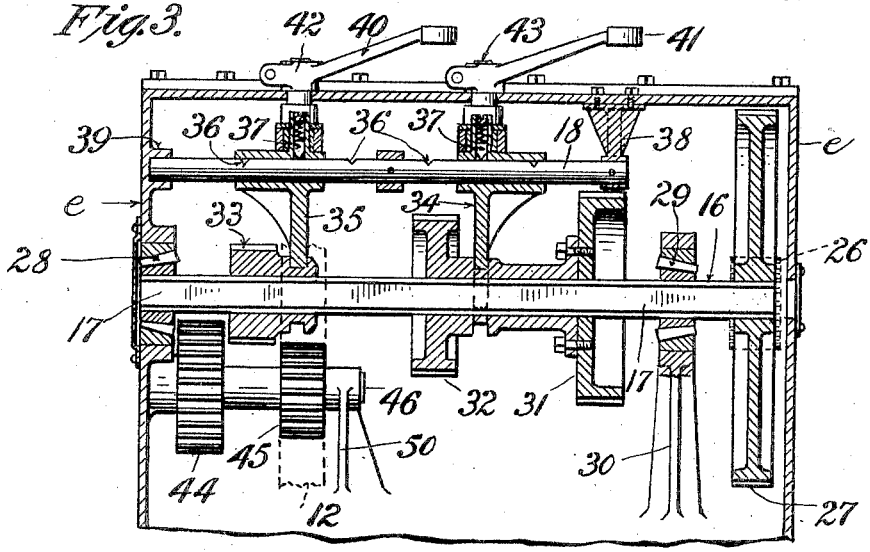
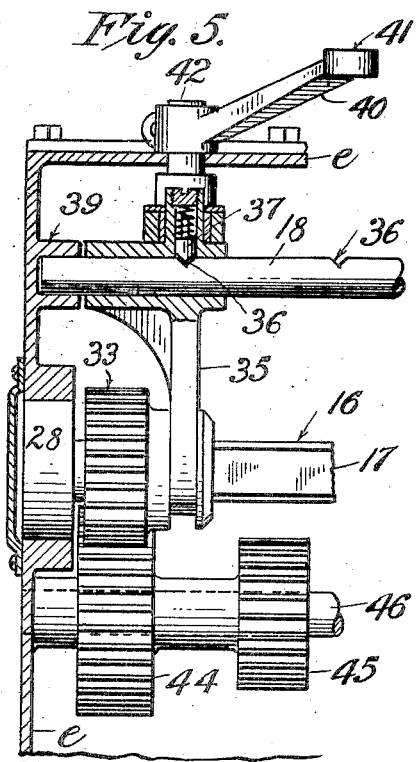
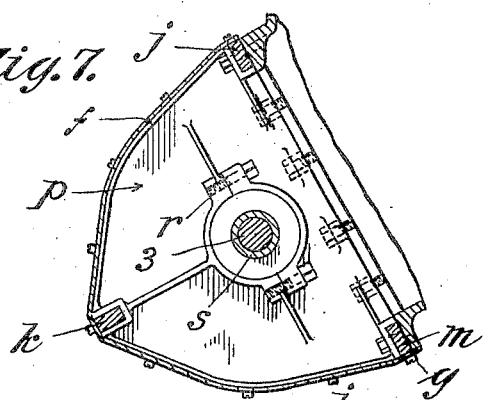
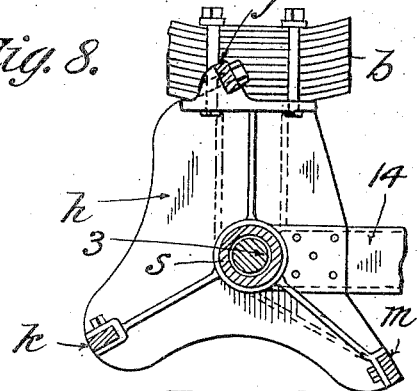
Witnesses:
H. S. Sprague
E. L. Smith
Inventor:
Harry A Knox
by Chapin & Co
Attorneys

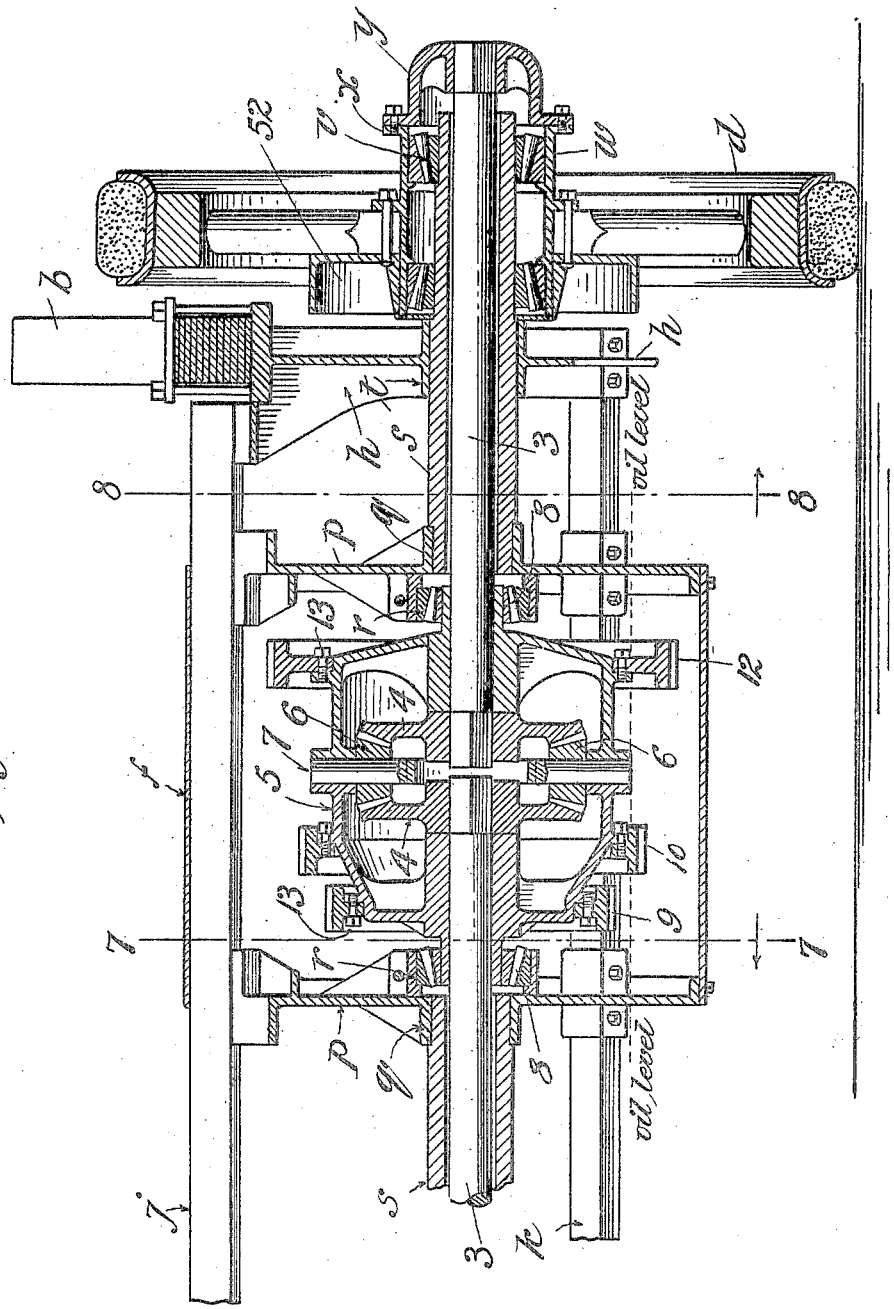

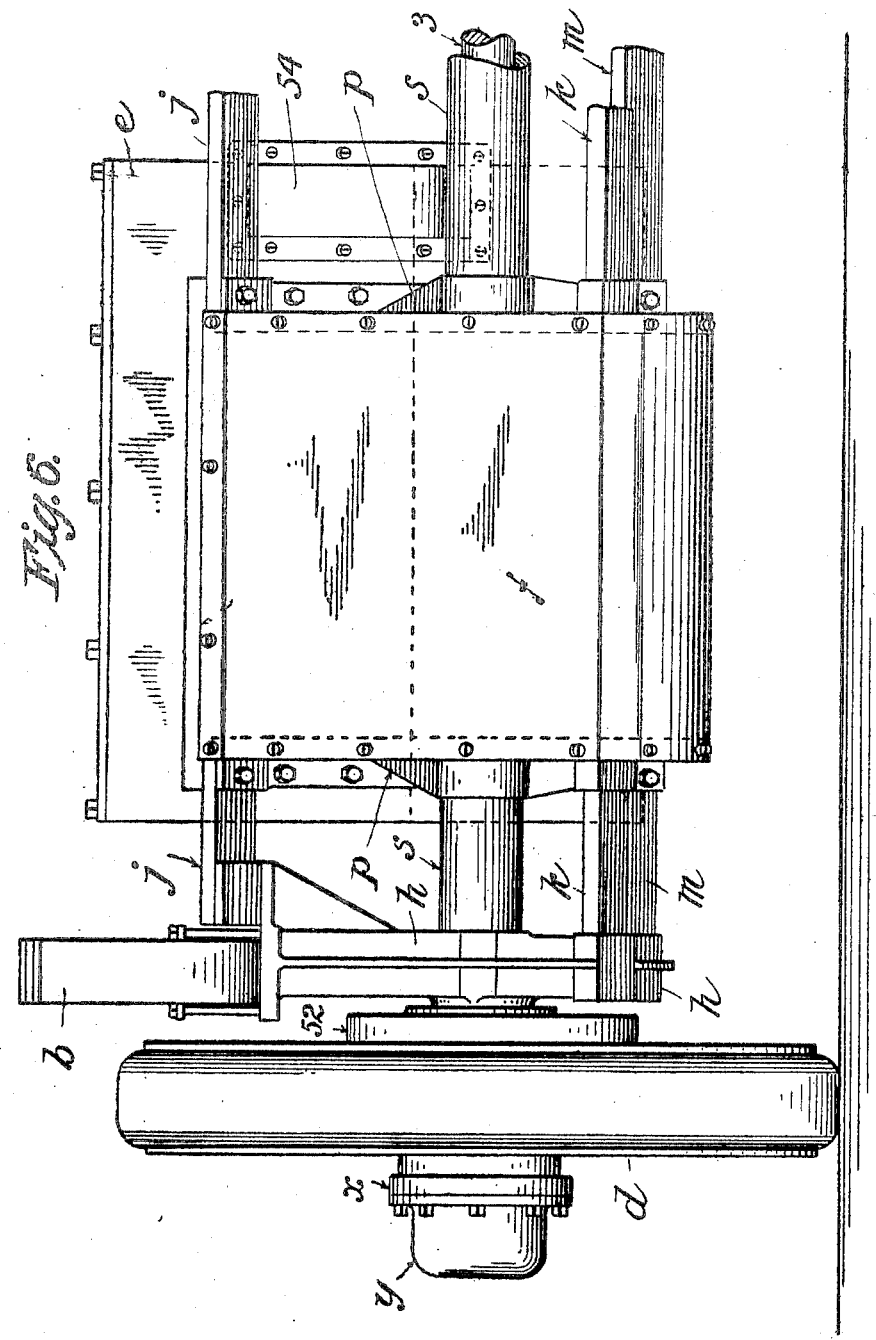

UNITED STATES PATENT OFFICE.

HARRY A. KNOX, OF SPRINGFIELD, MASSACHUSETTS.

MOTOR-VEHICLE.

No. 797,694.           Specification of Letters Patent.          Patented Aug. 22, 1905.

Application filed May 24, 1905. Serial No. 261,957.

*To all whom it may concern:*

Be it known that I, HARRY A. KNOX, a citizen of the United States of America, residing at Springfield, in the county of Hampden and State of Massachusetts, have invented new and useful Improvements in Motor-Vehicles, of which the following is a specification.

This invention relates to motor-vehicles, and particularly to an improved construction of truck-frames and power-transmitting mechanism especially adapted for use on motor-trucks, the object of the invention being to provide an improved mechanism of the character described wherein all of the connections between the motor and the driving-shaft are made directly with the latter through spur-gear connections, all of the mechanism, including the variable-speed-transmission devices and the motor, being completely inclosed in a casing, the framework of which is incorporated in the truck construction and in which are suitable bearings for the driving-shaft, the crank-shaft of the motor, and the shaft connected with the variable-speed gear, the clutch between the motor and the driving-shaft being located outside of the casing.

A further object of the invention is to provide certain specific improvements in the construction of the driving-shaft for the wheels and the association therewith of a compensating gear and means of connection between said driving-shaft and the variable-speed-transmission gearing and between said driving-shafts and the vehicle-wheels.

I am aware that it is not generically new to equip motor-vehicles with a driving mechanism which is gear-connected directly between the motor and the wheel-driving shaft, and I make no claim broadly to any such construction.

The various improved constructions in which my invention resides are clearly illustrated in the accompanying drawings, in which—

Figure 1 is a plan view of the mechanism embodying the invention, the inclosing casing being shown in section, the plane of which is indicated by the line 1 1, Fig. 2, it being noted that this section is in two parallel planes, one of which is near the top of the casing and the other through the center of the rear axle. The cylinders of the motor are broken off close to the casing in this view. Fig. 2 is a sectional side elevation taken in the plane of line 2 2, Fig. 1, and it will be noted that this section also follows an irregular course, as indicated by said line. Fig. 3 is a vertical sectional elevation in the plane of line 3 3, Fig. 2, this view illustrating, however, principally the movable parts of the variable-speed gearing. Fig. 4 is a sectional elevation, taken on line 4 4 of Fig. 2, through the axis of the driving-shaft, showing clearly the construction of the latter and the compensating gear and the gears with which the sliding gears of the variable-speed mechanism mesh. This view illustrates also the frame construction constituting the supports for the driving-shaft. Fig. 5 is an enlarged view of the left hand of Fig. 3, showing one of the sliding gears in a different position. Fig. 6 is a rear elevation of the rear axle and the casing which incloses the mechanism thereon and adjacent thereto. Fig. 7 is a side elevation showing one of the frame parts of the casing, certain parts being in section, the plane of which is on line 7 7, Fig. 4, looking in the direction of the arrow, the scale being somewhat reduced from that of Fig. 4. Fig. 8 is a side elevation of one of the frame parts supporting the rear axle and on the upper end of which one of the springs for the body of the vehicle is seated. The rear axle is shown in section, the plane of which is on line 8 8, Fig. 4.

Referring now to Fig. 2 of the drawings, *a* indicates the body of a truck, *b* one of the springs, and *c* the rear axle, (which in this case is the driving-axle,) *d* indicating one of the wheels. All of the mechanism, as stated, is inclosed within a casing, (indicated by *e* for the upper part thereof and *f* for the lower part, *g* being the line of division between the two parts.) As shown in said Fig. 2, the spring *b* is of the semi-elliptic type and is longitudinally disposed under the side sill of the vehicle-body and, as shown in Figs. 6 and 8 particularly, is seated on the upper end of a frame *h*. This frame part *h* constitutes practically a pedestal in which the driving-axle has a bearing, there being of course a duplicate of this frame part on the other side of the machine.

The construction and mode of supporting the rear axle will be referred to farther on.

Between the two frame parts or pedestals *h* are the transversely-extending metal bars *j*, *k*, and *m*. The bar *j* is bolted to the upper end of the pedestal *h*, and the bars *k* and *m* are fitted into recesses in the lower borders of the pedestal at each side of the center thereof, represented by the bearing therein for the rear axle, suitable bolts being provided to secure the bars in place. Located between the two pedestals $h$ and parallel therewith are two frame parts $p$, (shown in Fig. 7 in side elevation and in section in Fig. 4,) which constitute closures for the sides of that part of the casing indicated by $f$. These frame parts $p$ are castings, preferably of steel, and are provided with the exterior hubs $q$ and the interiorly-extending hubs $r$, as clearly shown in Fig. 4, the hubs $r$ being diametrically divided and provided with caps, as shown in said Figs. 4 and 7. The bars $j$, $k$, and $m$ extend through sockets in the borders of the members $p$, as shown, the latter being supported by said bars and rigidly bolted thereto.

The sleeves $s$, which constitute the rear axle, are secured by one end in the hubs $q$ of the frame parts $p$ by being screwed or brazed therein and extend out through bearings $t$ in the pedestals $h$ and far enough beyond the same to permit the driving-wheels $d$ to be mounted thereon, a roller-bearing (indicated as a whole by $v$) being located on the outer end of each of said sleeves for the wheels to run on.

The hubs $w$ of the driving-wheels are of metal, and their outer ends are flanged, as at $x$, or otherwise constructed, whereby the caps $y$, extending over and inclosing the outer ends of the sleeves, may be secured thereto. These caps have square holes extending therethrough in line with the axis of the sleeves $s$ to receive the squared ends of the driving-shaft 3, which is located within the sleeves, said shaft being made in two separate parts whose squared ends enter the hubs of the bevel-gears 4 4. These two gears constitute a part of a common form of a compensating gearing, they being inclosed within a casing 5, loose on the driving-shaft, having a bearing on the contiguous inner ends thereof, and in this casing are the beveled pinions 6 in mesh with the gears 4 and are mounted on studs 7 in the casing in the manner well understood. The casing is loose on the driving-shaft, having a driving connection therewith through the studs 7 and pinions 6.

Mounted within the hubs $r$, on the inner side of the frame part $p$, are roller-bearings 8 for the opposite ends of the hub of the casing 5. On the latter are mounted the beveled gears 9, 10, and 12, which preferably are made separate from the casing and secured thereto, as by the bolts 13 or in any other convenient way.

From the foregoing description it is clear that if the casing 5 be rotated by means of one of the gears 9, 10, or 12 the driving-shaft 3 will likewise be rotated and through it the driving-wheels $d$, the latter rotating on the bearing $v$, carried on the outer end of the sleeves $s$, which are stationary.

Referring to Fig. 8, it will be seen that in the plane of the driving-shaft provision is made for securing to the pedestal $h$ the horizontally-disposed frame member 14, which constitutes a reach extending, as shown in Fig. 1, toward the opposite end of the vehicle and constituting the side members of the truck-frame, there being one of course on each side of the latter, and, as seen in Fig. 2, a brace 15 extends across the vehicle and is bolted to the side members 14, this brace being located under the forward end of the casing, to which it is secured. The part $e$ of this casing is preferably of thin cast-steel, as it must be sufficiently rigid to constitute a frame for the crank-shaft 16 of the engine, the shaft 17, on which the sliding gears of the variable-speed mechanism are supported, and the shaft 18, which carries the forks, engaging the sliding gears, and it must be sufficiently rigid also to permit the engine-cylinders 19 to be bolted thereto, the connecting-rods 20 extending through openings in the forward end wall of the casing.

Referring to Fig. 1, it is seen that the bearings 21, 22, and 23 of the crank-shaft are located on vertically-disposed webs cast integral with the casing preferably, said crank-shaft extending through opposite sides of the casing and there being mounted on one end of the shaft the movable member 24 of a friction-clutch, the other member 25 thereof being mounted on a sleeve, or rather being provided with a hub through which the crank-shaft extends, this hub extending through and having a bearing in the casing and having a pinion 26 fixed thereon. The clutch member 24 rotates with the crank-shaft and slides thereon, being actuated by a fork $26^a$, whereby it may be thrown into clutch with the member 25 at will, whereby the pinion 26 may be rotated as desired. The latter is the main driving-pinion and transmits rotary movements to the shaft 17 through its engagement with the large gear 27, secured on said last-named shaft. The shaft 17 preferably is square and is supported in a roller-bearing 28, fixed in the wall of the casing, as shown in Fig. 3, and in another roller-bearing 29, supported on a standard 30, bolted to or cast integrally with the bottom of the part $e$ of the casing, as shown in Figs. 2 and 3 most clearly. Mounted on and rotating with the shaft 17 are the sliding gears 31, 32, and 33. 31 and 32 preferably are made in one piece or are secured together to move as one, being slidably actuated by means of a fork 34, mounted on the shaft 18 above the shaft 17. The gear 33 is actuated by the fork 35, also on the shaft 18, which is provided with stop-notches 36, and the hubs of the forks 34 and 35 are each provided with a spring-plunger 37, with a beveled end to snap into one of the notches 36 to locate the sliding gears in engaging position with one of the gears 9, 10, or 12, which have a driving connection with the shaft 3, as described. The shaft 18 is carried in bearings, one of which is in a hanger 38, the other of which is in a boss 39, cast on the wall of the casing, as shown in Fig. 3. To actuate the forks 34 and 35, elbow-levers 40 and 41 are provided pivotally supported on the casing at 42 43, one arm of said lever being outside of the casing, as shown, and the other arm within the casing and located at right angles to the shaft 18, the ends of these arms being forked and engaging with vertically-disposed studs on the hubs of the forks 34 35. Suitable connections extend from the ends of the arms of these levers outside the casing to the usual speed-controlling lever or levers within convenient reach of the operator of the vehicle, whereby the gears may be shifted as desired to obtain the required speed for the driving-shaft, and, as usual in this class of construction, provision is made to operate the fork 27, engaging the clutch member 24 on the crank-shaft to disengage it from the member 25 simultaneously with the shifting of the speed-gear. This has not been illustrated in the drawings, as it is a well-known construction common to nearly all motor-vehicles. To obtain a reversing-gear, a couple of pinions 44 and 45, constructed to rotate as one, are loosely mounted on a shaft 46 in proximity to the sliding gear 33 on the shaft 17. The pinion 45 is in constant mesh with the driving-gear 12 of the rear axle, and the sliding gear 33 on the shaft 17 may move from the position shown in Fig. 3 to the right into engagement with this gear 12 or to the left into engagement with the pinion 44, which then becomes an intermediate pinion, and driving through the pinion 45 will rotate the gear 12 in the direction opposite to that which would result from the direct engagement of the gear 33 with said gear 12. The shaft 46 is supported in the casing and in a standard 50 integral with or secured to the casing. No invention is involved in this reversing-gear construction.

Referring now to Fig. 2, it should be stated that the line of division between the parts $e$ and $f$ of the casing is made oil-tight, to the end that a supply of lubricating-oil may be carried in the lower part of the casing—say to a depth indicated by the dotted line on Fig. 1 marked "oil-level." This provides a sufficient depth of oil to properly lubricate the gears 9, 10, and 12, and the rotation of the latter and the engagement thereof with the sliding gears of the transmission device will so distribute the oil throughout the mechanism that it will work into all of the bearings and all of the contacting surfaces of the mechanism, and to insure the proper lubrication of the compensating gears openings 51 are made in the casing 5, as shown in Fig. 1. The usual brake-drum 52 is provided for the hub of the driving-wheel $d$, and the usual balance-wheel 53 is carried on the end of the crank-shaft opposite to that on which the clutch members 24 and 25 are mounted, this balance-wheel being also outside of the casing. It will be observed that the gear 27, which transmits movement from the crank-shaft to the shaft 17, extends into a pocket 54, made separate from and bolted to the casing on the side thereof opposite the crank-shaft, it being considered better construction to do this than to enlarge the casing proper sufficiently to receive it. This truck construction, it is needless to say, is designed for the heaviest kind of work and adapted to handle the heaviest loads, and the propelling mechanism and the connections therefrom to the driving-axle have been herein incorporated in the construction of the truck-frame itself and at the same time so inclosed as to protect the mechanism from the intrusion of dirt inseparable from the service in which these vehicles are used, the construction particularly aimed at herein being one which includes the greatest compactness possible, together with great strength, and a spur-gear-driving connection between the motor and the axle which is as simple and as direct as possible, one object especially in view at all times being the incorporation, as described herein, of the sleeves $s$ as a part of the truck-frame and constituting with the bars $j$, $k$, and $m$ transverse braces for said frame and rigid supports for the wheels $d$, the driving-shaft 3 being absolutely relieved of all strains save those of a torsional nature incidental to its function as a driving-shaft.

While the part $e$ of the casing, as stated, is made up of cast-steel parts, which is required because of the duties imposed upon it by reason of the various bearings located in its walls, the same strength is not required of the part $f$ of said casing except as far as the two end frames $p$ are concerned, which constitute supports for the inner ends of the sleeves $s$, and the wall of this part of the casing extending from one of the frame parts $p$ to the other may be made of sheet metal.

While the preferred construction contemplates making the frame parts $p$, the pedestals $h$, and the sleeves $s$ separately, the latter may be cast integral with the frame parts or integral with the pedestal or integral with both one of the frame parts and one of the pedestals.

Having thus described my invention, what I claim, and desire to secure by Letters Patent of the United States, is—

1. In a motor-vehicle, a truck-frame comprising longitudinally-disposed parallel frame parts having openings therein in axial alinement, a sleeve secured to the frame parts and extending outwardly therefrom in line with the openings and in opposite directions, the outer ends of said sleeve constituting bearings for the vehicle-wheel; bars extending between the frame parts and secured thereto, said bars and frame parts constituting the skeleton of an inclosing casing for part of the driving mechanism of the vehicle.

2. In a motor-vehicle, a truck-frame comprising longitudinally-disposed reaches, parallel frame parts having openings therein in axial alinement; sleeves secured in each opening and extending outwardly from the frame parts in opposite directions, and beyond the reaches; pedestals secured to the reaches and having bearings therein for said sleeves, and bars extending transversely of said frame parts and pedestals, and secured to both, the outer ends of the sleeves constituting bearings for the vehicle-wheels.

3. In a motor-vehicle, a truck-frame comprising longitudinally-disposed parallel frame parts having openings therein in axial alinement; a sleeve secured in each opening and extending outwardly from the frame parts in opposite directions, and bars extending between the frame parts and secured thereto, said bars and frame parts constituting the skeleton of one part of an inclosing casing for the driving mechanism of the vehicle, the remaining part of the casing consisting of a rigid box-like structure secured to said frame parts, a suitable motor supported on and exteriorly of the casing, the crank-shaft for the motor being located within the casing.

4. In a motor-vehicle, a pair of pedestals and suitable body-springs seated thereon, transversely-disposed brace-bars extending from one pedestal to the other, a casing for the driving mechanism of the vehicle supported between the pedestals, said casing comprising rigid parallel frame parts secured to said brace-bars, there being openings through said frame parts and pedestals having a common axis; a sleeve secured by one end in each frame part and extending outwardly therefrom in opposite directions and through the pedestals, a two-part driving-shaft located in said sleeves, and compensating gears to connect the contiguous ends of the driving-shaft, and means to rotate the driving-shaft through the compensating gears.

5. In a motor-vehicle, a truck-frame, a pair of sleeves rigidly supported in axial alinement, the outer ends of the sleeves constituting bearings for the vehicle-wheels; a driving-shaft in two parts located in said sleeves, a compensating gearing to rotatatively connect the inner ends of the driving-shaft, and a casing for said gearing; gears encircling the casing of the compensating gear; a variable-speed mechanism operatively connected with said gears on the casing; a box-like casing in which said variable-speed mechanism and the crank-shaft of a motor are located, and motor-cylinders mounted on the casing exteriorly thereof, together with a friction-clutch between the motor and variable-speed mechanism.

6. In a motor-vehicle, a two-part driving-shaft, rigidly-supported sleeves in which the shaft parts are located, and a frame for the sleeves, the latter extending beyond the frame and constituting bearings for the vehicle-wheels; suitable wheels, and means of connection between the hubs of the latter and the outer ends of the driving-shafts; compensating gears constituting a driving connection between the shaft parts, a casing for the compensating gears, gears encircling the casing, and a suitable variable-speed mechanism having an operative relation to the gears on said casing.

7. In a motor-vehicle, a truck-frame, a closed casing consisting of separable parts rigidly secured to the frame; a pair of sleeves in axial alinement rigidly supported in said casing and in said truck-frame, parts of said casing constituting a part of the truck-frame, being immovable, another part of the casing being removably secured thereto; a two-part driving-shaft located in said sleeves, a variable-speed mechanism, and a motor having an operative relation thereto, located in the removable part of said casing, and suitable gears operatively connected with the driving-shafts and with the variable-speed mechanism, together with a clutch between said mechanism and the motor.

8. In a motor-vehicle, a truck-frame, a closed casing consisting of separable parts rigidly secured to the frame, a pair of sleeves in axial alinement and constituting a part of the frame; certain parts of said casing with which said sleeves are associated being immovable, the other part of the casing being removably secured thereto; a two-part driving-shaft located in said sleeve, a compensating gearing operatively connecting the contiguous ends of the two-part driving-shaft; a variable-speed mechanism and a motor operatively connected therewith, said mechanism and the crank-shaft of said motor being located in the removable part of said casing, and a clutch between said crank-shaft and said mechanism.

9. A truck-frame consisting of longitudinally-disposed reaches and pedestals with which the reaches are connected, transversely-disposed brace-bars extending from one pedestal to another and secured thereto, frame parts located between the pedestals on either side of the longitudinal center of the frame and parallel therewith and suitably secured to said brace-bars, a pair of sleeves rigidly secured to, or forming part of, said frame parts or pedestals, extending in axial alinement from each frame part outwardly beyond the reaches and constituting bearings for the vehicle-wheels; wheels mounted on said sleeves and means, extending through the sleeves, to rotate said wheels.

10. In a motor-vehicle in combination with the rear axle thereof, wheels rotatively mounted on a pair of sleeves in axial alinement and constituting a part of the truck-frame, a two-part driving-shaft located in said sleeves, and a compensating gearing to operatively connect the contiguous ends of the parts of the driving-shaft, a casing consisting of separable parts one part of which encircles the rear axle and is permanently incorporated in the frame of the truck; a motor, variable-speed-transmission mechanism supported in another and movable part of the casing, and devices extending through the wall of the movable part of said casing to actuate the variable-speed mechanism.

11. In a motor-vehicle, a casing, sleeves extending outwardly therefrom in axial alinement and in opposite directions constituting a hollow axle, the outer ends of which constitute bearings for the vehicle-wheel; a two-part driving-shaft in said sleeves, a compensating gearing forming a driving connection between the inner ends of the shaft, a supporting-case for the gearing into which the ends of the shaft extend, certain parts of said gearing being carried by the supporting-case; gears encircling said supporting-case, and a suitable variable-speed mechanism having an operative relation to said gears on the case.

12. In a motor-vehicle, a frame, a casing having one open side, oppositely-located, axially-alined sleeves on the casing, constituting a hollow axle, the outer ends of said axle constituting bearings for the vehicle-wheels, a driving-shaft in said axle; a motor removably mounted on the open side of said casing, and having a driving connection with said shaft.

HARRY A. KNOX.

Witnesses:
    WM. H. CHAPIN,
    H. L. SPRAGUE.